US006883632B2

(12) United States Patent

McHardy et al.

(10) Patent No.: US 6,883,632 B2

(45) Date of Patent: Apr. 26, 2005

(54) MANUAL-ELECTRIC WHEELCHAIR DRIVE DEVICE

(76) Inventors: Lang J. McHardy, 62 Contenta Ct., San Luis Obispo, CA (US) 93401; Willie Urena, 1401 Albany St., Los Angeles, CA (US) 90015

(*) Notice: Subject to any disclaimer, the term of this patent is extended or adjusted under 35 U.S.C. 154(b) by 0 days.

(21) Appl. No.: 10/187,156

(22) Filed: Jun. 28, 2002

(65) Prior Publication Data

US 2003/0000748 A1 Jan. 2, 2003

Related U.S. Application Data

(60) Provisional application No. 60/302,437, filed on Jun. 29, 2001.

(51) Int. Cl.[7] .............................................. B60K 26/00

(52) U.S. Cl. ......................... 180/315; 180/13; 180/65.5

(58) Field of Search ............................... 180/65.1, 65.5, 180/65.6, 65.8, 205, 206, 207, 220, 11, 12, 13, 315, 335, 272

(56) References Cited

U.S. PATENT DOCUMENTS

| | | | | |
|---|---|---|---|---|
| 3,921,744 A | | 11/1975 | Benoit et al. | |
| 4,085,814 A | * | 4/1978 | Davidson et al. | 180/206 |
| 4,168,758 A | * | 9/1979 | Holt | 180/206 |
| 4,364,448 A | * | 12/1982 | Ikuma | 180/206 |
| 4,695,071 A | | 9/1987 | Johnston | |
| 5,016,720 A | | 5/1991 | Coker | |
| 5,024,286 A | * | 6/1991 | Lean et al. | 180/206 |
| 5,375,676 A | * | 12/1994 | Takata et al. | 180/206 |
| 5,845,727 A | * | 12/1998 | Miyazawa et al. | 180/205 |
| 5,878,829 A | | 3/1999 | Kanno et al. | |
| 6,009,964 A | | 1/2000 | Ishida | |
| 6,296,072 B1 | * | 10/2001 | Turner | 180/220 |

* cited by examiner

*Primary Examiner*—Kevin Hurley

(57) ABSTRACT

An input device (such as a rotational hand crank) receives a constantly-applied motion, and outputs a signal to a controller which, in turn, sends an appropriate signal to an electric motor, which is connected to the chair via a mechanical transmission. The wheel is removably mounted in front of a wheelchair such that the front wheels of the chair are lifted above the ground. The device is generally steered manually, such as by pivoting an input device to one side.

18 Claims, 5 Drawing Sheets

MANUAL-ELECTRIC WHEELCHAIR DRIVE DEVICE

RELATED APPLICATION

This application claims priority under 35 U.S.C. §119(e) to U.S. Provisional Application 60/302,437, filed Jun. 29, 2001, the entire contents of which is incorporated herein by reference.

BACKGROUND

1. Field of the Invention

The invention relates in general to wheelchairs, and specifically to a wheelchair driven by an electric motor according to a constantly applied physical motion.

2. Background

Many people are physically disabled and bound to wheelchairs. Some of these people are of such an age or level of mental development that they are unable to maturely handle a standard joystick-type powered wheelchair. For example, imagine a two year old child with a degenerative muscular disease that prevents her from using a fully manual wheel chair. It is very desirable that she and other children in similar situations be able to move about under their own volition due to the importance of exploration to a young child's development. Such children are too young to responsibly manage a standard joystick-type electric wheelchair, and thus it is desirable to provide a device that will produce motion only in response to a continuous physical motion. This need for physical input automatically limits the range and speed that the child may move because she will eventually get tired and stop.

SUMMARY

Thus, in one embodiment, a wheelchair drive device is provided comprising a frame configured to be mounted to a wheelchair. It may be desirable to allow the frame to be easily removable. An input device is mounted to the frame in a position such that a continuous physical motion may be applied thereto. The input device is in electrical communication with a controller which is also mounted to the frame. An electric motor, and a wheel are joined in mechanical communication by a transmission, and mounted to the frame such that the wheel may be driven by the motor, and the wheel may be steered by the input device.

In an alternative embodiment, an input device is configured to receive a continuous physical motion applied by a user. A motor is provided in electrical communication with the input device, and a wheel is pivotably held by a frame which is configured to be mountable to a front of a wheelchair. A transmission is disposed between the motor and the wheel such that the wheel is driveable by the motor. The device is configured such that when the continuous physical motion stops, the motor also stops.

In yet another embodiment, a method of mounting a drive system to a wheelchair is provided. According to the method, a wheelchair having a lower horizontal cross-member and a pair of upright structural members is provided. A drive system comprising a frame, a wheel, a transmission, and an input device is also provided. The frame comprises a main support member and a cross support member. A first bracket is then mounted to the lower horizontal cross-member of the wheelchair. The first bracket comprises a stem. Second and third brackets are mounted to each of the upright structural members of the wheelchair. The main support member is slid over the stem, and the cross-support member is inserted into open portions of the second and third brackets. In a further embodiment, at least one cable is provided and tensioned in order to raise a pair of front wheels out of contact with the ground.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the present invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF DRAWINGS

Having thus summarized the general nature of the invention, certain preferred embodiments and modifications thereof will become apparent to those skilled in the art from the detailed description herein having reference to the figures that follow, of which.

DETAILED DESCRIPTION

Embodiments of a wheelchair drive device 10 will now be described with reference to the attached FIGS. 1–4. Although the following embodiments are discussed in the context of an automatic wheelchair drive device, those skilled in the art will recognize that many of the features and advantages recited herein may be realized in connection with other devices and systems, and such embodiments are intended to be within the scope of the present disclosure. Furthermore, it should be recognized that no single feature or element should be considered essential or solely responsible for the successful practice of the embodiments described herein. In the attached figures, wires indicating electrical connections have been omitted in order to avoid confusion. Those skilled in the art will understand how to connect the various electrical components upon a reading of the present disclosure.

Figure 5:
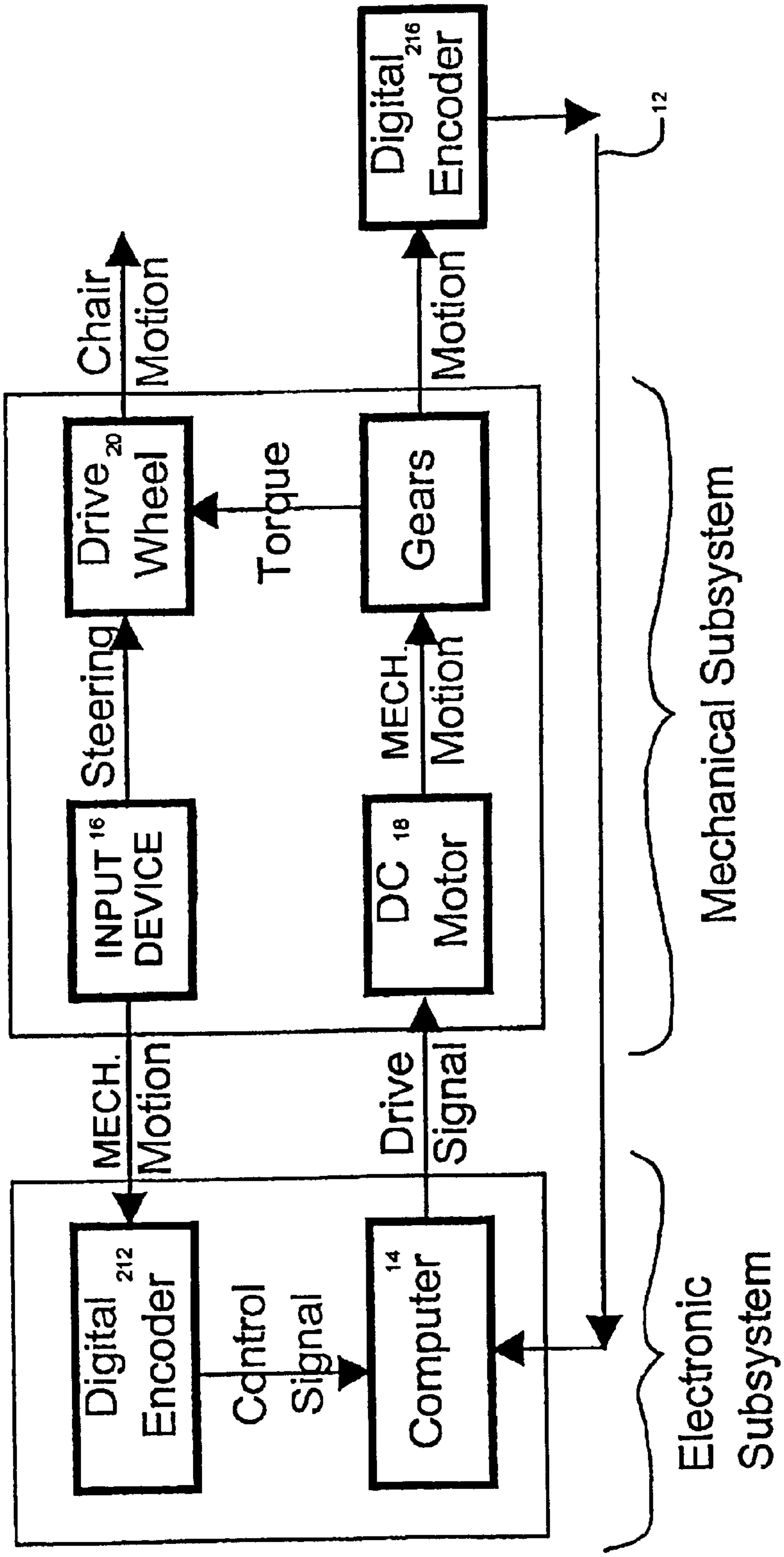
FIG. 5 is a schematic block diagram of an embodiment of the mechanical and electrical subsystems of the drive system of FIG. 1.

In one embodiment, as illustrated schematically in FIG. 5, the device comprises a mechanical subsystem and an electronic subsystem. The user sends control signals to a computer or controller 14 by providing a substantially continuous physical motion applied to an input device 16. A suitable continuous motion may comprise rotation of a hand crank, linear displacement of a lever, or any other continuous or repeatable motion. A signal, such as a DC current, is then supplied to a motor 18 that drives a wheel 20 mounted in front of the chair 100. Clockwise or counterclockwise rotation of the hand crank preferably results in corresponding forward or backward motion of the chair. The user can also steer and stop the chair using a single set of controls. Steering is accomplished by moving the input assembly 208 left or right in a direction opposite to the intended turn. A brake may be configured to automatically engage a wheel when the motor stops running. The device may also be configured to be easily removable from the wheelchair so that the chair may be used without the drive device or may be folded up for transportation or storage.

In one exemplary embodiment, the controller 14 receives a digitally encoded signal from the hand crank 214, determines the amplitude and direction of the signal and outputs a proportional signal to the motor 18. In this way, clockwise or counterclockwise rotation of the hand crank 214 may be used to create forward or backward motion of the chair 100. Similarly, an increase or decrease in a rate of hand crank rotation may result in faster or slower motion of the chair 100. According to the present embodiment, the signal is received from the input device 208 by a first digital encoder 212. A second digital encoder 216 may be used to create an automatic feedback loop 12 shown in FIG. 5 for example.

Figure 1:
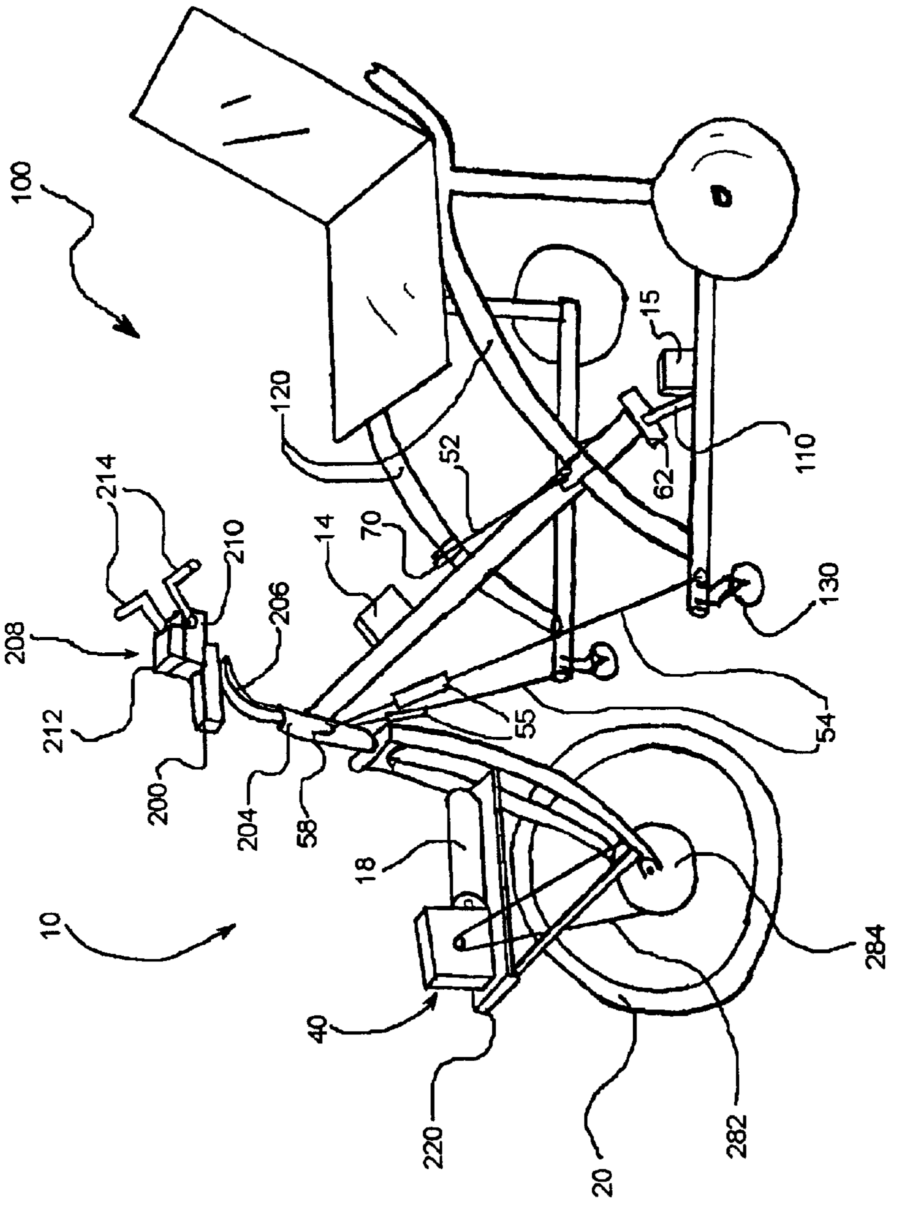
FIG. 1 is a perspective view of a wheelchair drive device mounted to a wheelchair.
Figure 2:
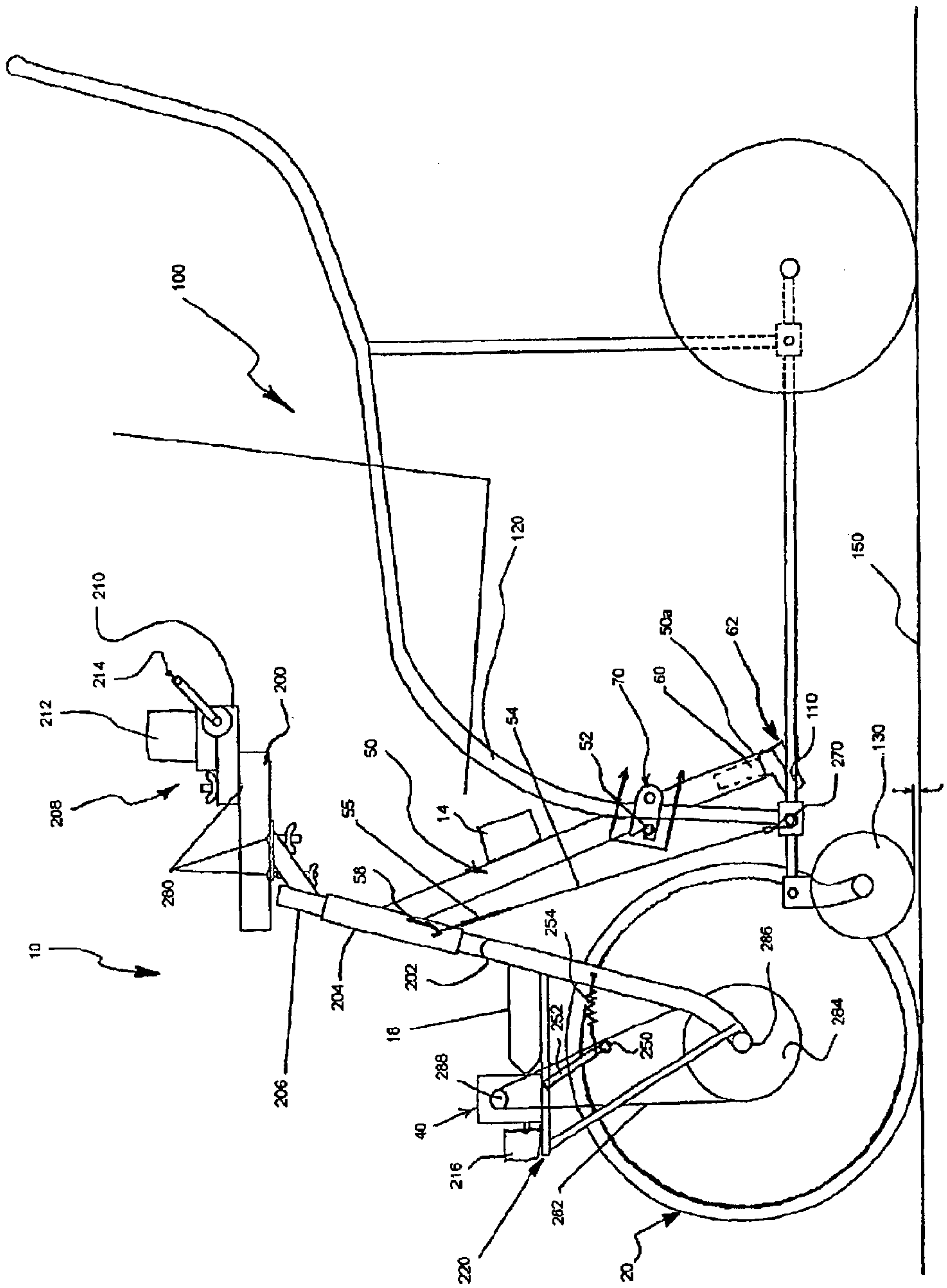
FIG. 2 is a side view of the wheelchair drive device and wheelchair of FIG. 1.

In one embodiment shown in FIGS. 1 and 2, the device 10 generally includes a frame 220 that mounts a wheel 20 in front of a wheelchair 100. The frame 220 may include a fork 202, such as a bicycle fork for mounting the wheel 20. The wheel 20 is driven by a motor 18 through a transmission 40, the motor 18 being driven by a controller 14 which receives a signal from an input device 210. The output signal from the controller 14 corresponds in magnitude and direction to the input from the hand crank 214. The motor is mounted to the frame 220 above the wheel 20 and is coupled to the wheel 20 through a transmission 40. In one embodiment, the transmission comprises a speed reducer, a chain, and a torque limiter.

The rotational hand crank 214 is shown attached to an extension arm 200 that is inserted into a fork 202 that is pivotable within a head tube 204. The head tube 204 is attached to the chair 100 by a combination of a main support tube 50 having a cross-support member 52 and a pair of tensioning cables 54. Attached to the fork 202 is preferably a rigid triangular frame 220 to support the motor 18 and a portion of the transmission 40. The triangular frame 220 may be attached to the fork by any suitable method such as by welds, bolts, adhesives, etc.

FIGS. 1 and 2 illustrates a possible mounting system for mounting the device to the chair. In the illustrated embodiment, the apparatus 10 is mounted to the chair 100 at five attachment points. The main support tube 50 is mounted to an existing cross bar 110 of the chair by inserting a free end **50*a* of the support tube 50 into a stem 60 attached to a lower bracket 62 mounted to a cross member 110 the chair 100**.

The lower bracket 62 shown comprises first and second halves having channels formed therein. The channels are configured to receive a structural member of the chair such as the cross member 110 shown in FIGS. 1 and 2. The halves may be clamped to one another by screws, bolts, or any other method such that a cross-member of the chair is sandwiched therebetween. A rubber shim or gasket may be placed around the cross member in order to protect a painted surface of the cross member 110.

The main support tube 50 may comprise any suitable material in any appropriate size and shape that it performs as described herein. For example, a thin-walled steel tube may be appropriate for some arrangements. Alternatively, aluminum, composite, or other material tubes may also be desirable.

As shown in FIG. 1, a cross-support member 52 is rigidly attached to the main support tube 50 such that the cross-member 52 is substantially perpendicular to the main support tube 50. The cross-member 52 may comprise a solid rod, or hollow tube of any suitable material such that it provides substantially rigid support to the main support member 50. The cross-support member 52 slides into mounting brackets 70 on each of the two vertical chair members 120, and may be located by a pair of shaft collars 72 or other devices which surround the mounting brackets 70. In an alternative embodiment, the cross-member 52 may comprise one or more cables attached to a portion of the main support member 50, and extending to the vertical members of the chair 100. The cross-support member 52 may be made from any suitable material. In some embodiments, it may be desirable to allow the cross support member to be somewhat bendable in order to allow the cables to be tensioned to raise the wheels a more substantial distance as will be recognized by those skilled in the art in view of the present disclosure.

Figure 4:
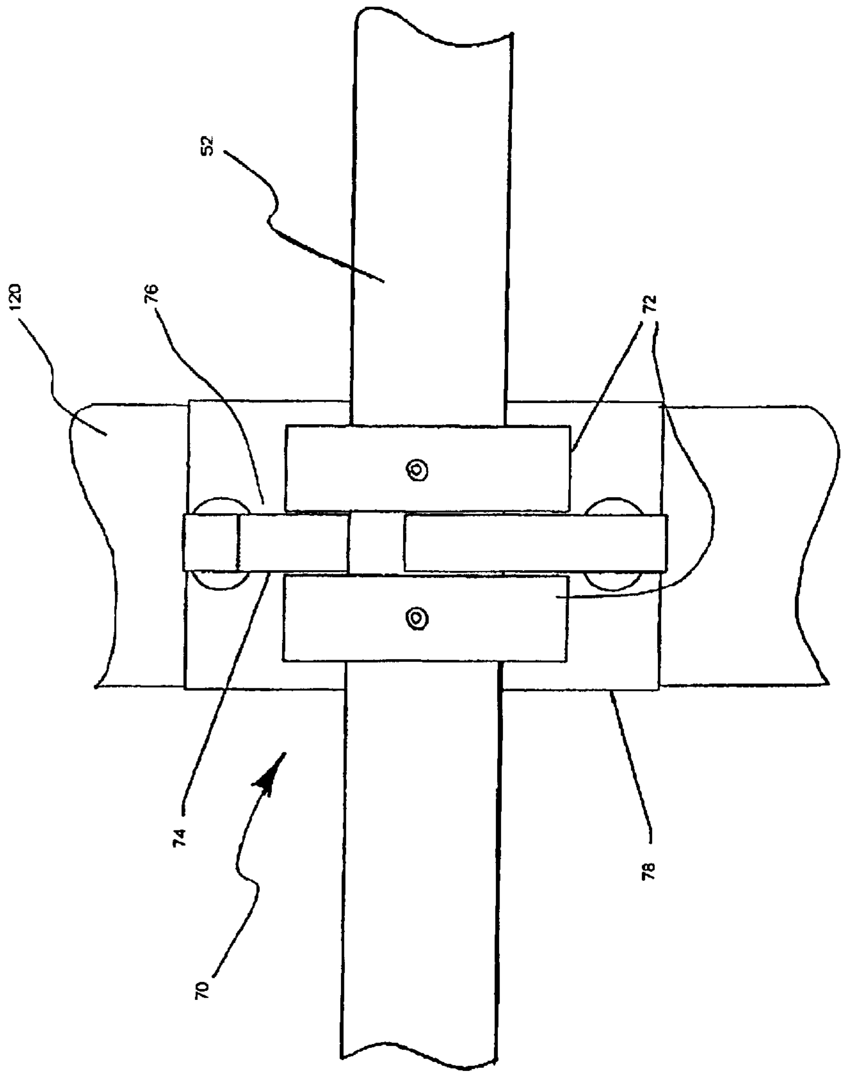
FIG. 4 is a detail view of a mounting bracket attached to an upright structural member of the wheelchair and supporting a cross-support member.

A cross support member 52 mounted in a mounting bracket 70 is shown in detail in FIG. 4. In the embodiment shown, the mounting brackets 70 comprise a plate 76 with an angled slot 74 formed therein. The plate 76 is generally attached to a clamping member 78 which is configured to surround and clamp to an upright member 120 of the wheelchair. The plate 76 may be attached to the clamping member 78 by welds, adhesives, or any other method recognized as suitable. The angle of the slot 74 may be formed such that it will be substantially parallel to the stem 60 (see FIG. 1), such that the device 10 may be easily installed and removed from the brackets.

Hooks 58 may be provided on either side of the head tube 204 such that cables 54 may extend from the hooks 58 to portions of the base of the chair 100. Brackets or hooks may be provided on the base of the chair for attachment of the cables thereto. Alternatively, the cables may be attached directly to existing structural features of the chair (such as a bolt head as shown in FIG. 2). The cables 54 may be tensioned by turnbuckles 55 or other device such that an upward force is applied to the front of the chair 100 substantially near the front wheels 130 of the chair 100. This upwardly-directed vertical force is preferably sufficient to raise the front wheels 130 of the chair 100 out of contact with the ground 150, thereby creating a three-wheeled vehicle. The cables 54 may be any suitable material known to those skilled in the art, such as steel, nylon, etc.

A cross-support member 52 is preferably positioned at a point along the length of the main support tube 50 such that the cross support member 52 intersects with the vertical members 120 of the chair 100. When tightened using the turnbuckles 55, the cables 54 provide a force between a lower portion of the chair such as the posts located just above the front wheels 103 of the chair 100, and the head tube 204 such that the front wheels of the chair 100 are lifted slightly off the ground 150. This provides sufficient contact between the wheel 20 and the ground 150 to allow rotation of the wheel 20 to propel the chair 100.

The hand-crank 210, illustrated in FIG. 2, converts the physical input of the user to a signal that is fed to the controller 14. In one embodiment, a rotational digital encoder 212 is mounted to the hand crank 214 such that a digital signal is provided to the controller 14. Alternatively, analog devices such as a rotational potentiometer or a generator may be employed to create an analog signal to be supplied to an analog controller. In some embodiments it may be desirable to provide a second digital or analog device 216 at an output of the motor 18 in order to provide feedback for an automatic speed control system.

Figure 3:
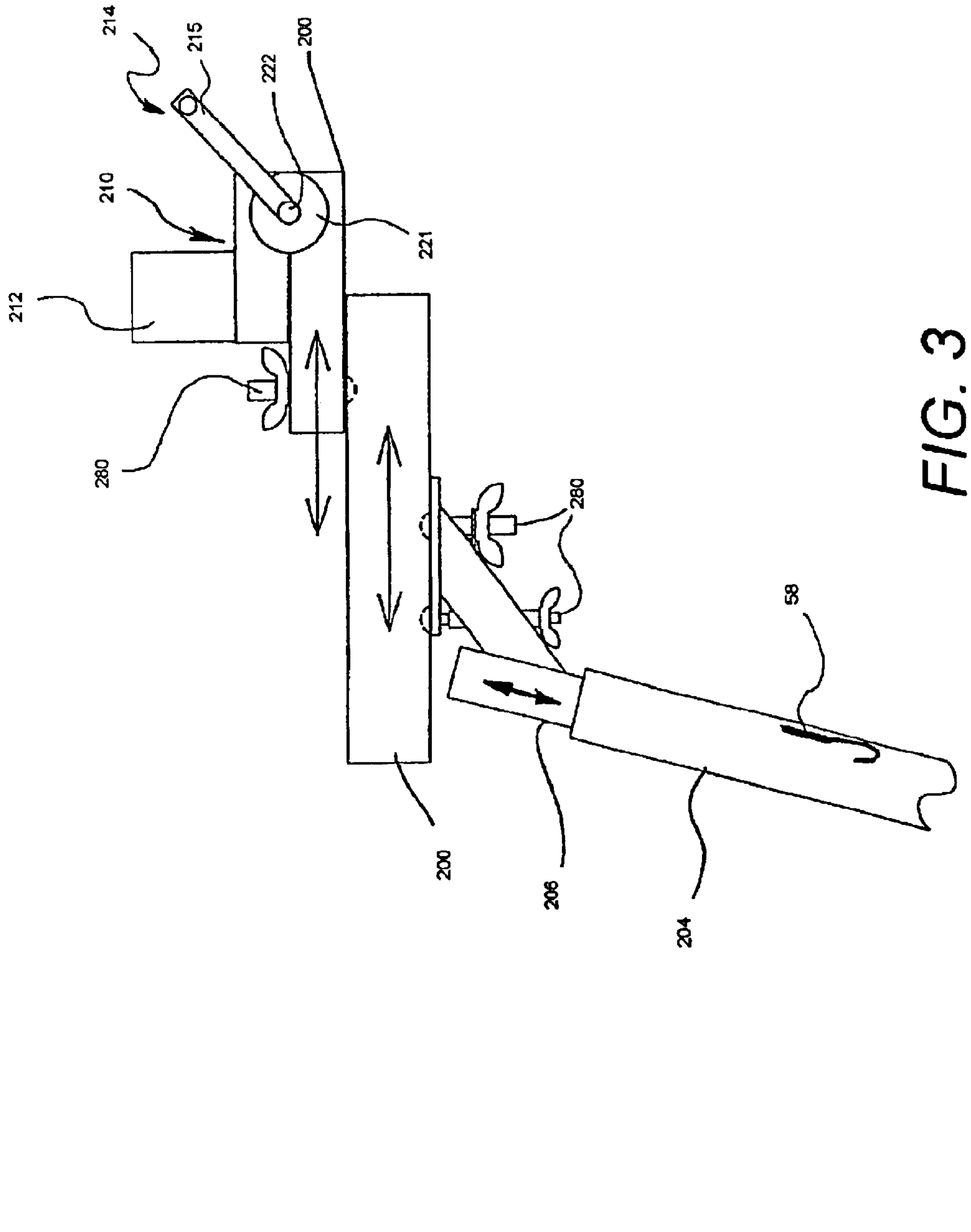
FIG. 3 is a detail view of an input device of the drive device of FIG. 2.

The input device 208 shown in detail in FIG. 3, generally comprises a two-piece input bracket 210 which holds a bearing housing 221 and a rotating shaft 222. The bearing housing 221 is placed between the two pieces of the input bracket 210. The hand cranks 215 may be attached to the shaft with a quick-release screw for easy removal of the cranks 215. The hand crank arms 215 may be fabricated from steel, plastic, aluminum or other suitable material. The input bracket 210 may be adjustably attached to an extension tube 200, which is attached to a stem 206 placed in the head tube 204. The extension tube 200 shown is square and has slots on two opposite faces, which allow bolts 280 extending from inside the tube 200 to be used to adjustably mount the tube 200 to the stem 206, and the bracket 210 to the tube 200. Alternatively, the tube 200 may comprise other cross-sectional shapes such that it may perform as shown and described herein.

As will be clear to those skilled in the art in view of the present disclosure, the input device 208 is generally provided in a position relative to the chair such that a user may comfortably reach and apply a continuous motion to the input device as well as employing the input device to steer the chair. In order to facilitate various sizes of users, the position of the input device may be adjustable as described.

The drive train may comprise a small motor, speed reducers, a torque limiter, and a chain. In one embodiment, a plastic and steel cable-chain 282 (manufactured for example by W M Berg, inc) is employed to drive a sprocket 284 attached directly to the wheel hub 286. A worm wheel speed reducer may be employed to drive the wheel sprocket via the cable chain. The worm wheel speed reducer has the particular advantage that it cannot be easily back-driven, and will thus provide a braking force to resist the motion of the wheel 20 when the motor 18 is not running. Alternatively, a brake such as a centrifugal clutch, or a caliper brake may be used to stop unwanted motion of the chair. The Berg cable chain has the particular advantages that it is quiet, has zero backlash, requires no lubrication, and is resistant to rust. Thus the chain will not be subjected to shock loading caused by backlash, and will operate substantially smoothly without grease.

The triangular motor frame 220 may be fabricated from right-angle stock steel and attached to the fork 202 which is pivotally mounted to the head tube 204. Alternatively, square, circular, or other cross-sectional material may be used to form a suitable frame. Those skilled in the art will recognize that a variety of materials and methods may alternatively be used to form a frame as shown and described herein.

With reference to FIG. 2, the wheel 20 is preferably of such a size that it may be suitably proportional to the wheelchair to be used. In one embodiment, the wheel 20 has an externally threaded hub 286. In this embodiment, the wheel sprocket 286 to be used for the chain 282 may be threaded to match the threads of the wheel hub 286. The sprocket 284 may then be threaded onto the wheel hub 286, and locked into place using a lock ring, nut or other suitable device. A thread locking adhesive may also be used to ensure that the sprocket remains tightly attached to the hub. A tensioning sprocket 250 may be provided in order to maintain sufficient tension in the cable chain 282. The tensioning sprocket 250 may be mounted on a pivoting arm 252 which may be biased by a spring 254 in order to provide the desired tension. The pinion sprocket 288 attaches directly to the output shaft of the worm wheel speed reducer, and is secured to the shaft by one or more set screws or other suitable method.

In one embodiment, the drive train is arranged to provide a maximum chair speed of about 3 ft per second. In this way, the chair may not significantly exceed an average walking pace, and thus the user will not be able to move faster than an attendant can walk. In another embodiment, a mechanical or electrical hi/lo switch may be disposed within the transmission in order to allow an attendant to switch the chair between a high and low speed mode. In the low speed mode, the chair is preferably limited to a maximum speed of about 1 foot per second. A torque limiter may also be used. In one embodiment the torque limiter is placed on a relatively low torque setting in order to avoid breakage of the chain in the event of the user attempting to drive the chair when motion is stalled due to an obstacle.

As described, the drive device 10 is preferably removably mounted to the wheelchair 100 such that it may be removed from the chair for transportation or storage. The process of attaching and removing the drive device 10 from the chair 100 will now be described with reference to FIGS. 1 and 2. In order to remove the device 10, the tension in the cables 54 is removed by loosening the turnbuckles 55. Once a sufficient amount of tension has been removed, the cables 54 may be removed from the chair 100. Once the cables 54 are removed, the device 10 may simply be lifted away from the chair 100 thereby removing the cross-member 52 from the mounting brackets 70 on either side of the chair 100 and removing the main support member 50 from the stem 60 of the lower bracket 62. The device 10 may be attached to the chair 100 simply by inserting the stem 60 of the lower bracket 62 into the main support tube 50, and aligning the cross-member 52 with the mounting brackets 70, and finally attaching and re-tensioning the cables 54 until the front wheels 130 of the chair are lifted off the ground 150.

In other embodiments, the transmission may be configured to drive the rear wheels of the wheelchair. In this embodiment, the rear wheels may be driven simultaneously, or independently, or with a drive shaft and differential. In this embodiment, steering may be managed by independently driving the rear wheels at different speeds, or by providing a steering apparatus mounted to the front wheels. Those skilled in the art will recognize that if a steering apparatus is used, the rear wheels should be driven with a differential to allow for the rear wheels to rotate at different speeds during turning.

The controller 14 is generally enclosed in a housing, and placed at any suitable location on the drive device 10. For example, the controller 14 may be mounted to the cross-support member 52 as shown in FIG. 1. A power source 15, such as a battery is also supplied, and mounted to any appropriate portion of the chair 100.

What is claimed is:

1. A wheelchair drive device comprising:

a frame configured to be mounted to a wheelchair;

a controller mounted to the frame;

an input device mounted on the frame in a position such that a continuous physical motion may be applied thereto, the input device being in electrical communication with the controller;

an electric motor configured to be driven by the controller;

a wheel rotatably held by a portion of the frame at a central axis of the wheel and being pivotable about an axis which is normal to the central axis of the wheel; and a transmission in mechanical communication with the motor and the wheel such that the wheel is driveable by the motor;

wherein the controller is configured to receive an input signal from the input device only when the continuous motion is applied to the input device, and wherein the controller is configured to provide power to the motor only when the input signal is received.

2. The wheelchair drive device of claim 1, wherein the frame is configured to be mounted to a wheelchair so as to place the input device within arm's reach of an occupant seated in the wheelchair.

3. The wheelchair drive device of claim 1, wherein the frame is removably mounted to the chair.

4. The wheelchair drive device of claim 3, further comprising at least one cable configured to raise a front wheel of a wheelchair above a ground surface.

5. The wheelchair drive device of claim 4, wherein the frame comprises a cross-bar which is removably receivable in at least one bracket attached to an upright member of the wheelchair.

6. The wheelchair drive device of claim 5, wherein the frame comprises a main support tube removably received on a bracket attachable to the wheelchair.

7. The wheelchair drive device of claim 1, wherein the input device comprises a rotational hand crank.

8. The wheelchair drive device of claim 1, wherein a position of the input device is adjustable in at least two axes.

9. The wheelchair drive device of claim 1, wherein the controller is configured to drive the motor at a rate which is directly proportional to a rate of continuous motion applied to the input device.

10. The wheelchair drive device of claim 1, wherein the controller is configured to drive the motor at a constant speed when a rate of continuous motion applied to the input device exceeds a pre-determined value.

11. The wheelchair drive device of claim 1, further comprising a first digital encoder in mechanical communication with the input device, and in electrical communication with the controller.

12. The wheelchair drive device of claim 11, further comprising a second digital encoder in mechanical communication with the motor, and in electrical communication with the controller.

13. A wheelchair drive device comprising:

an input device configured to receive a continuous physical motion applied by a user;

a motor in electrical communication with the input device;

a wheel pivotably held by a frame such that the wheel is pivotable about an axis which is normal to a central axis of the wheel, the frame being configured to be mountable to a front of a wheelchair so as to place the input device within arm's reach of an occupant seated in the wheelchair;

a transmission disposed between the motor and the wheel such that the wheel is driveable by the motor;

wherein the device is configured such that when the continuous physical motion stops, the motor also stops.

14. The wheelchair drive device of claim 13, wherein the wheel is pivotable about at least two axes.

15. The wheelchair drive device of claim 13, wherein the frame is configured to be mounted to the wheelchair such the wheelchair is supported only by a pair of rear wheels, and the wheel held by the frame.

16. The wheelchair drive device of claim 13, wherein the input device is a rotational hand crank.

17. The wheelchair drive device of claim 13, wherein the device is configured such that a speed of the motor is directly proportional to a rate of rotation of the hand crank.

18. The wheelchair drive device of claim 13, wherein the transmission comprises a cable chain.

* * * * *